Patented Jan. 22, 1952

2,583,160

UNITED STATES PATENT OFFICE 2,583,160

POROUS ZIRCON REFRACTORY AND METHOD OF MAKING

Everett A. Thomas, North Tonawanda, N. Y., assignor, by mesne assignments, to National Lead Company, New York, N. Y., a corporation of New Jersey No Drawing. Application March 15, 1947, Serial No. 735,028

8 Claims. (Cl. 106—41)

This invention relates to the production of porous insulating refractories and more particularly to porous zircon refractories containing an improved bonding agent.

Early suggestions for the preparation of porous zirconium silicates are contained in U. S. Patent 2,101,947 of Charles J. Kinzie and in U. S. Patent 2,341,561 of Charles J. Kinzie and Eugene Wainer. Porous refractories, in the past, have been prepared by incorporating with a refractory material a suitable quantity of an organic pore-forming material, producing an homogeneous slurry from such mass and burning out the pore-forming material by firing at an elevated temperature. In general, bonding materials have been incorporated in such mixes but such bonding agents have tended to decrease the excellent refractory properties of the ziron. Refractory bricks produced by the generally employed pore-forming operations suggested heretofore produce structural brick in which the unit weight is about 6 to 7 pounds for a 9-inch straight. Where attempts are made to produce porous ziron refractories of a unit weight lower than this, it has been found that so much bond is required as to materially reduce the refractoriness of the finished porous zircon article. Thus, plastic clays, and the like, reduce the refractoriness of zircon markedly. Where relative porosity is attempted by using a very large volume of combustible pore-former, increased amounts of plastic bonds must be employed evenly to distribute and hold the pore-former in uniform suspension. Where the bond is non-plastic, the pore-forming material, such as cork, wood chips, sawdust or other organic combustible material, cannot be held in suspension except when using minimum amounts of the pore-forming material with the ultimate result that the finished refractory is too dense and possesses too high thermal conductivity for the purposes desired.

It is an object of the present invention to produce materials that are highly refractory, highly porous and which possess a relatively high strength. It is another object of the invention to increase the refractoriness of porous zircon refractories without harmfully affecting the porosity and strength or, alternatively, to increase the strength without harmfully affecting the porosity and refractoriness, or to increase the porosity without harmfully affecting the refractoriness and strength.

These and other objects are accomplished by preparing slurries of zircon and a pore-forming ingredient and adding thereto a small amount of the mineral hectorite. The zircon preferably employed is the commercial grade of pure zircon which contains about 97 to 98% zirconium silicate, the balance consisting of small amounts of impurities such as alumina, silica, iron and titania. In general, the zircon is ground to a fineness such that it will pass a 325 mesh screen.

A variety of pore-forming material may be mixed with the zircon as, for instance, sawdust, wood chips, ground resins, hard chipped waxes, cork, and the like. The important feature of the pore-former is that it burns away in the firing operation without leaving any substantial proportion of ash. For reasons of economy, scrap cork is preferred as the pore-forming ingredient. The scrap cork is ground and will generally have a size of from about 20 mesh to 200 mesh. This is designated as "ground cork."

The mineral, hectorite, has been found to be a very excellent bond for the purposes of the present invention. In the small percentages employed herein, it possesses a strong bond for zircon without reducing the refractoriness of the fired zircon article materially. The mineral swells strongly in water and is a highly plastic agent. By reason of this property, two to three times the amount of pore-forming agent can be incorporated with a given amount of zircon, without loss of structural strength as compared to the bonds heretofore used. By reason of this duel function of the mineral hectorite, bricks weighing 3.5 to 4 pounds per 9-inch straight can be prepared readily. Whereas extremely large amounts of plasticizing materials were heretofore required to maintain such an amount of pore-former in perfect suspension, due to the plasticizing properties of hectorite in water, perfect suspensions are obtained without undue amount of added bond and, therefore, a fired brick can be prepared with excellent refractory properties. Thus, compositions containing this mineral as a bond can be formed by wet mud processes and, on drying, sufficient green strength is developed so that the dried form may be handled mechanically.

The mineral hectorite is a calcareous colloidal magnesium bentonite. The average mineralogic analysis is as follows:

|  | Per cent |
|---|---|
| Collodial hydrated magnesium silicate | 37 to 40 |
| Lime calculated as calcite | 50 to 60 |
| Iron oxide | 0.1 to 0.3 |
| Alumina | 0.3 to 1.4 |
| Fluorine as magnesium fluoride | 2 to 4 |

The mineral is ground preparatory to use and, in general, should be ground to pass a 200 mesh screen. The amount of the mineral hectorite employed as a bond will be from about 1 to 3 parts thereof for every hundred parts by weight of zircon. The higher the amount of mineral bond, the greater the volume of pore-former which can be incorporated with the zircon.

In accordance with the present invention, the milled zircon, hectorite and pore-former are blended and water added in amounts sufficient to yield a soft mud consistency. Brick is then formed by ramming this mud into a suitable mold as, for instance, a greased wooden mold or by any other conventional forming operation. The piece so formed is dried, preferably in a humidity drier wherein the temperature is increased 10 to 20° F. per hour up to about 350° F., although other methods of drying may be employed. The piece is then burned by heating to approximately 2600° F. by gradually heating the form to the maximum temperature and holding for a period of time sufficient to obtain a coherent article. Satisfactory bricks have been formed by heating from room temperature to 1000° F. at the rate of about 20° F. per hour, which rate can then be increased to from 75° F. to 100° F. per hour from 1000° F. to 2600° F. Final refractory article has been found to be formed after heating at 2600° F. for 6 hours. The following examples are merely illustrative of the invention and are not to be deemed limitative thereof. Throughout the examples, cork has been used as a specific pore-forming material although the invention is not limited thereto as other organic materials may be employed in lieu thereof as previously stated herein.

Example I

The following ingredients are thoroughly mixed:

100 pounds —325 milled zircon
22 gallons ground cork
3 pounds hectorite
7 to 8 quarts water After thorough blending, the shapes are formed, dried, and fired. A nine inch straight weighs just over 3 pounds and is suitable for use up to 3000° F.

Example II

The following ingredients are thoroughly mixed:

100 pounds —325 milled zircon
16 gallons ground cork
3 pounds hectorite
5 to 6 quarts water After blending and finishing as above, a nine inch straight weighs about 4.0 pounds, and is suitable for use up to 3200° F.

Example III 100 pounds of —325 mesh zircon
2 pounds of hectorite
16 gallons of cork
5 to 6 quarts of water A nine inch straight weighs about 4.0 pounds and the brick is suitable for use up to about 3250° F.

Example IV 100 pounds of —325 mesh zircon
1 pound of hectorite
12 gallons of cork
4 to 5 quarts of water A nine inch straight weighs between 5 and 5.5 pounds and the brick is suitable for use up to 3300° F. Structurally it is not as strong as the same composition using 3 pounds of hectorite, but its strength is ample where excessive crushing loads are not encountered.

Where extremely large zircon insulating refractory shapes are required, it will be found preferable to add some material imparting high green strength to the composition. This additional strength may be obtained by the addition of a soluble phosphate of the type which on heating forms phosphorus pentoxide, plus a small amount of boric acid. In general, mono-ammonium phosphate and boric acid are added in the following amounts:

For each 100 parts zircon, 1 part mono-ammonium phosphate and ½ part boric acid.

These auxiliary bonding agents may be preferably added by mixing one part of mono-ammonium phosphate and ½ part of boric acid with 2½ parts of finely ground zircon, and use about 4 parts of this mixture to 100 parts of zircon. This will permit the production of a prepared composition to which the necessary amount of pore-former and water may be added.

Example V

The following ingredients are thoroughly mixed:

100 pounds —325 mesh zircon
2 pounds of hectorite
4 pounds of auxiliary pre-mixed binder as described above
16 gallons of cork
5 to 6 quarts water.

The composition of this example may be formed into shapes equivalent to 10 nine-inch straight bricks which can be formed, dried and fired as previously described. The products of this example are suitable for use up to 3200° F.

In accordance with the present invention, it is possible to incorporate cork as a pore-former up to about 22 gallons for each 100 pounds of zircon in contrast with 8 gallons of cork per hundred pounds of zircon using a non-plastic bond. By the employment of such large quantities of pore-former structurally satisfactory ware of a weight of 3.5 to 4 pounds per nine-inch straight brick is possible.

What is claimed is:

1. The method of making a porous zircon refractory which comprises firing a mass comprising zircon, a pore-forming organic material and the mineral hectorite as a binder, to a temperature sufficiently high to burn out the pore-forming material and sinter the remaining material to a refractory porous mass.

2. The method of making a porous zircon refractory which comprises firing a mass comprising zircon, ground cork as a pore-forming material and the mineral hectorite as a binder, to a temperature sufficiently high to burn out the pore-forming material and sinter the remaining material to a refractory porous mass.

3. The method of making a porous zircon refractory which comprises firing a green mass comprising zircon, a pore-forming organic material and sufficient of the mineral hectorite to bond the zircon and organic material, to a temperature sufficiently high to burn out the pore-forming material and sinter the remaining material to a refractory porous mass.

4. The method of making a porous zircon refractory which comprises firing a green mass comprising zircon, sufficient pore-forming organic material to produce a fired weight of from 3 to 5.5 pounds per 9 inch straight and from 1 to 3 parts of the mineral hectorite per 100 parts of zircon by weight, to a temperature sufficiently high to burn out the pore-forming material and sinter the remaining material to a refractory porous mass.

5. The method of making a porous zircon refractory which comprises making an aqueous slurry of zircon, sufficient pore-forming organic material to produce a fired weight of from 3 to 5.5 pounds per 9-inch straight and sufficient of the mineral hectorite to maintain the pore-forming material in suspension in the zircon slurry, and thereafter molding the slurry to form a green shaped mass and firing the latter to a temperature sufficiently high to sinter the mass.

6. The method of making a porous zircon refractory which comprises making an aqueous slurry of zircon, sufficient pore-forming organic material to produce a fired weight of from 3 to 5.5 pounds per 9-inch straight and at least 1 part by weight of the mineral hectorite for each 100 parts by weight of zircon and thereafter molding the slurry to form a green mass and firing the latter to a temperature sufficiently high to sinter the mass.

7. The method of making a porous zircon refractory which comprises making an aqueous moldable slurry of zircon, ground cork and the mineral hectorite in the proportion 100 pounds zircon, 1 to 3 pounds of hectorite, 12 to 22 gallons of ground cork, molding the slurry to form a green shaped mass and firing the latter to a temperature sufficiently high to sinter the mass.

8. A porous zircon refractory brick weighing 3 to 5.5 pounds per 9-inch straight and containing as a binder the thermal reaction product of the mineral hectorite.

EVERETT A. THOMAS.

REFERENCES CITED

The following references are of record in the file of this patent:

UNITED STATES PATENTS

| Number | Name | Date |
| --- | --- | --- |
| 1,997,282 | Weigel | Apr. 9, 1935 |
| 2,341,561 | Kinzie et al. | Feb. 15, 1944 |
| 2,390,765 | York | Dec. 11, 1945 |
| 2,406,909 | Schoenlaub | Sept. 3, 1946 |

OTHER REFERENCES

Searle—Refractory Materials—(1917) page 254.
Ser. No. 382,101, Passelecq et al. (A. P. C.) published May 11, 1943.